UNITED STATES PATENT OFFICE.

FRANCIS BASHNAGEL, OF NEW YORK, N. Y.

IMPROVEMENT IN COMPOSITIONS FOR TREATING RUBBER AND GUTTA-PERCHA.

Specification forming part of Letters Patent No. 13,420, dated August 14, 1855.

*To all whom it may concern:*

Be it known that I, FRANCIS BASHNAGEL, of the city, county, and State of New York, have invented a new and useful improvement in the arts by which all vulcanized and hard india-rubber and gutta-percha substances prepared, cured, or manufactured by any of the processes described in Letters Patent of the United States and granted to Charles Goodyear, and known as "vulcanized or hard rubber or gutta-percha," or prepared, cured, or manufactured by any other process, so as to resist successfully, without material change, the variations of temperature below that under which it was prepared, and also the action of the expressed and essential oils and other known solvents of caoutchouc or india-rubber gum, may be changed, decomposed, or converted into a liquid state or to a soft and plastic or gummy state and condition, so as that it may be subjected to the process of grinding, like caoutchouc or india-rubber gum, and used again in the manufacture of various india-rubber and gutta-percha substances and fabrics.

Caoutchouc or india-rubber and gutta-percha gums, when once subjected to such processes and modes of preparing, curing, and manufacturing whereby the gum or substance becomes so changed in its properties as to resist without material change the variations of temperature below that under which it was cured, and also the action of the expressed and essential oils and other known solvents of caoutchouc or india-rubber gum—that is to say, when once manufactured into shoes, car-springs, hose, packing, combs, canes, and other fabrics or substances, according to the patent or patents of Charles Goodyear or any other mode by which the properties of the original substance or gum are changed, as aforesaid, after the substances or articles so manufactured have served their purpose and become unfit for longer use in the form in which it was manufactured—is nearly or quite a useless article, and until my discovery incapable of being again used in the manufacture of india-rubber or gutta-percha articles and fabrics.

By the term "vulcanized or hard rubber or gutta-percha" I mean caoutchouc or india-rubber and gutta-percha which, by the process of preparing, manufacturing, and curing as aforesaid, are so changed in their properties as to resist successfully, without material change, the variations of temperature and the action of the known solvents of india-rubber gum.

To render this nearly useless article, after once used for the purpose for which it was manufactured, a useful one in the manufacture of new articles or fabrics, and to restore to it some of the qualities of the original gum, so that the old vulcanized and hard rubber or gutta-percha substances could be again ground and worked in the different processes of manufacture, I instituted a series of experiments. By applying to these vulcanized or hard substances naphtha, (or rock-oil) or ether sulphuric, or chloroform, I found that to a certain degree these substances softened, and I obtained good results. I found that by the application of any ingredients or compounds containing carbon hydrogen to hard or vulcanized rubber and gutta-percha that they were rendered softer. By the application to these substances of india-rubber-oil—an oil obtained by the distillation of india-rubber gum—I obtained better results, the vulcanized and hard substances being thereby softened and rendered fit for use as a gum; but I obtained the best results by the application of alcohol absolutus and carbon-bisulphuratum, (or "alcohol - sulphuris," as I term it.)

To enable others skilled in the arts most nearly allied to this to change, decompose, and convert vulcanized or hard rubber and gutta-percha substances to a liquid state or to a soft plastic or jelly-like state, so that it can be reground and remanufactured into various india-rubber and gutta-percha substances and fabrics, I will here describe the mode of my procedure by which I have been enabled to obtain the best results.

The articles or chemicals combined which I apply to vulcanized or hard rubber and gutta-percha in effecting the described change or conversion are alcohol absolutus and carbon-bisulphuratum, (or alcohol-sulphuris,) which materials may be employed in varying proportions; but that which I have found to answer the best, and to which it is desirable to approximate in forming the compound and effecting the change, is as follows:

I take one hundred pounds of vulcanized or hard rubber or gutta-percha and cut or break it in pieces and put it in a barrel or other ves sel or place capable of being hermetically closed and made air-tight. I then take one-fourth of one pound of alcohol absolutus and ten pounds of carbon-bisulphuratum and mix them together, and then pour the mixture upon said vulcanized and hard rubber or gutta-percha in the barrel or other place, and then close the barrel or other vessel containing the same hermetically or air tight, and allow the same to remain thus closed for two hours.

The process above described will reduce hard or vulcanized rubber and gutta-percha to a soft, plastic, and gummy state, and ready and subject to be ground in the ordinary way of grinding india-rubber gum, and to be again manufactured into useful articles; or by putting a larger quantity of the above solvent to a given quantity of vulcanized or hard rubber and treating it as aforesaid it will be reduced or changed to a liquid state.

The above proportions may be varied or changed, and larger or smaller quantities of alcohol absolutus and carbon-bisulphuratum, or the compound made of the two, may be applied to the same or proportionate quantities of vulcanized or hard rubber, and the same may remain hermetically closed a greater or less time.

I find that the greater the quantity of the above-described compound applied to a given quantity of hard or vulcanized rubber the less time will it take or require to be kept together hermetically closed to produce a given result, and vice versa.

What I claim is not an "improvement in the restoration of caoutchouc, gutta-percha, and other similar gums," "by first treating the vulcanized gum with alkalies," &c., "for extracting the sulphur," &c., "and then submitting the mass to the action of heat and turpentine or any other liquid known to be a solvent of the gum in its natural condition," all of which quotations are in the patent granted to Fenchswayne and Beers, assignees of Beers, May 29, 1858, being an improvement in devulcanizing india-rubber; but

What I claim is—

The conversion or restoration of caoutchouc or gutta-percha, whether they have been vulcanized or not, into a soft, plastic, and workable state, by a new combination of chemical agents, so that they may be remanufactured in a state already vulcanized or not, according as the substances converted or restored had or had not been vulcanized, the substances which I use for this purpose being bisulphurate of carbon in conjunction with alcohol absolute, and not common alcohol, without the addition of any other chemical agent and without the application of heat, substantially as set forth.

FRANCIS BASHNAGEL.

Witnesses:
A. WILLMANN,
ED. STERGERY.